United States Patent [19]

Roberts et al.

[11] Patent Number: 4,735,838

[45] Date of Patent: Apr. 5, 1988

[54] WATERPROOF MEMBRANE

[75] Inventors: Michael G. Roberts; Charles E. Bolen, both of Heath; John L. Kane, Newark, all of Ohio

[73] Assignee: Owens-Corning Fiberglas Corporation, Toledo, Ohio

[21] Appl. No.: 817,647

[22] Filed: Jan. 10, 1986

[51] Int. Cl.$^4$ .................... B32B 11/04; C08L 31/00
[52] U.S. Cl. .................... 428/40; 428/194; 428/351; 524/68; 524/69
[58] Field of Search .................... 428/40, 194, 351; 524/68, 69

[56] References Cited

U.S. PATENT DOCUMENTS

| | | | |
|---|---|---|---|
| 2,581,920 | 1/1952 | Kuhn | 428/462 |
| 2,647,843 | 8/1953 | Bemmels | 428/351 |
| 2,892,592 | 6/1959 | Greene et al. | 238/283 |
| 3,253,521 | 5/1966 | Endres | 94/23 |
| 3,265,765 | 8/1966 | Holden et al. | 260/876 |
| 3,333,517 | 8/1967 | Kohler | 94/22 |
| 3,342,613 | 9/1967 | Schelhorn | 428/511 X |
| 3,345,316 | 10/1967 | Nielsen | 260/28.5 |
| 3,707,901 | 1/1973 | Bynum et al. | 94/9 |
| 3,741,856 | 6/1973 | Hurst | 161/88 |
| 3,844,668 | 10/1974 | Winters et al. | 404/72 |
| 3,891,585 | 6/1975 | McDonald | 260/28.5 |
| 3,900,102 | 8/1975 | Hurst | 206/411 |
| 3,930,100 | 12/1975 | McDonald | 428/323 |
| 3,978,014 | 8/1976 | Van Beem et al. | 260/28.5 |
| 4,021,393 | 5/1977 | McDonald | 260/28.5 |
| 4,032,491 | 6/1977 | Schoenke | 260/28.5 |
| 4,068,023 | 1/1978 | Nielsen et al. | 427/138 |
| 4,069,182 | 1/1978 | McDonald | 260/28.5 |
| 4,091,135 | 5/1978 | Tajima et al. | 428/150 X |
| 4,115,335 | 9/1978 | Reusser et al. | 260/28.5 |
| 4,172,830 | 10/1979 | Rosenberg et al. | 428/245 |
| 4,175,978 | 11/1979 | Marzocchi | 106/281 |
| 4,196,115 | 4/1980 | Bresson | 260/28.5 |
| 4,330,449 | 5/1982 | Maldonado et al. | 524/68 |
| 4,332,703 | 6/1982 | Lijzenga et al. | 524/68 |
| 4,358,554 | 11/1982 | Yan et al. | 524/69 |
| 4,381,357 | 4/1983 | Von der Wettern et al. | 524/68 |
| 4,421,807 | 12/1983 | Clausing et al. | 428/194 X |
| 4,436,864 | 3/1984 | Grossi et al. | 524/458 |
| 4,440,816 | 4/1984 | Uffner | 428/268 X |
| 4,460,723 | 7/1984 | Rollmann | 524/68 X |
| 4,464,427 | 8/1984 | Barlow | 428/40 |
| 4,485,201 | 11/1984 | Davis | 428/63 X |
| 4,654,385 | 3/1987 | Roberts et al. | 524/69 |

FOREIGN PATENT DOCUMENTS 1598071 9/1981 United Kingdom ............... 428/351

OTHER PUBLICATIONS

Bituthene Waterproofing System, Aug. 1983, W. R. Grace & Co. brochure, pp. 1 to 12.
W. R. Grace brochure "Heavy Duty Bituthene".
W. R. Grace brochure "Ice & Water Shield", May 1984.

*Primary Examiner*—Henry F. Epstein
*Attorney, Agent, or Firm*—Patrick P. Pacella; Robert F. Rywalski

[57] ABSTRACT

A membrane for waterproofing a building component, e.g., a roof or a basement wall. The membrane includes a first layer of asphalt-elastomer blend which preferably is self-adherent to the building component and an overlying layer of plastic film which bears at least one adhesive strip adhered to the plastic film. The membrane is in the form of elongated strips which are overlapped to cover the building component, and the adhesive of each strip ensures a waterproof joint between the laminae of the overlapped strips.

13 Claims, No Drawings

WATERPROOF MEMBRANE

TECHNICAL FIELD

The present invention relates to a laminated, water-impermeable membrane for application to a substrate, such as roof deck, a basement wall, or the like to prevent the leakage of water. The membrane is in the form of an elongated, relatively narrow strip which may be self-adherent to the substrate or which may be applied over a primer coating, if desired, for adhesion to the substrate. The membrane includes an elastomer-asphalt primary lamina which is covered completely by a plastic film lamina, such as polyethylene, and at least one edge portion of the plastic film is coated with an asphalt-based adhesive by means of which adjacent strips can be overlapped and secured to provide a waterproof joint.

BACKGROUND AND SUMMARY OF THE INVENTION

In the past, membranes of the type proposed in the present invention have been provided for covering a substrate, such as a roof deck or a basement wall, to provide a waterproof coating for the substrate. Such membranes conventionally include a release paper lamina upon which is superimposed a primary lamina which is a rubber-modified asphalt of appreciable thickness. An upper lamina of a plastic film, typically polyethylene, is applied to the upper surface of the primary lamina and is bonded thereto by heat and pressure to provide a composite membrane which is generally in the form of an elongated, relatively narrow strip which is unrolled onto the surface to be covered.

It generally is necessary to apply a plurality of such strips in overlapping relation to the substrate in order to completely cover the substrate surface. In order to provide a sealed overlap, the uppermost plastic lamina does not completely cover the primary lamina. Thus, an uncovered "selvage" edge or "bead" of uncovered primary lamina is left exposed, so that the two primary lamina of adjacent strips can be brought into sealing contact when the strips are overlapped. This "bead" or "selvage" edge is generally only about $\frac{1}{8}$ to about $\frac{1}{2}$" wide, and it does not provide a sufficient area to ensure sealing of the two primary lamina to one another. Further, it is necessary in manufacturing the membrane to apply a narrower strip of plastic lamina to the underlying primary lamina in order to leave the "bead," and severe registration problems have occurred during manufacturing so that an inadequate bead is often provided. Also, the plastic lamina provides an additional waterproofing layer in the membrane and the presence of the "bead" results in a poor quality membrane at the overlapped portions.

The present invention provides a membrane which differs substantially from those in the prior art and which possesses several attributes missing from the prior art. In the present invention, the primary lamina and the plastic covering lamina are coextensive so that the entire surface of the primary lamina is covered with the plastic film lamina. Consequently, there are no problems of registration during manufacture, and the membrane has uniform waterproofing properties and other properties throughout its entire extent.

In accordance with the present invention, one or more edges of the uppermost plastic lamina bear a layer of asphalt-based adhesive which is of substantially greater width, i.e., on the order of at least $\frac{1}{2}$ inch and preferably from 1$\frac{1}{2}$ to 3 inches, in width, to accommodate substantial overlapping between adjacent strips and to provide a substantially improved seal between the adjacent strips.

The specific adhesive composition which is utilized on the plastic film is an important aspect of the present invention. This adhesive must adhere firmly to the plastic film, typically a polyethylene film, and it also must retain the overlapping primary lamina in position. Preferably, this adhesive is a composition of the type disclosed in our co-pending application U.S. Pat. No. 4,654,385, filed in the United States Patent and Trademark Office on Dec. 30, 1985, and incorporated herein by reference. The adhesive generally is an aqueous emulsion of a chemically modified asphalt and non-modified asphalt emulsified in an emulsion medium which comprises water plus a surfactant. It has been found that such an emulsion adhesive results in excellent adherence to the plastic film of the membrane, firmly adheres to the overlapping primary lamina, and the emulsion is non-toxic and environmentally safe since it contains no organic solvents.

DETAILED DESCRIPTION OF THE PRESENT INVENTION

The water-impermeable membrane of the present invention includes a central layer or primary lamina which is a blend of asphalt, an elastomeric polymer, either synthetic or natural, and a filler, if desired. This primary lamina layer is relatively thick, the thickness ranging from about 10 to about 180 mils and preferably from about 30 to about 100 mils. In a commercial embodiment of the invention, the thickness of the layer 11 is about 55 mils.

The primary layer is superimposed upon a release paper, which is a sheet of Kraft paper or the like impregnated or coated with a suitable release medium, such as a wax, or preferably, a silicone. Such release papers are well known in the art, and the release paper prevents blocking of the membrane layer to other layers of the membrane when the membrane is rolled and packaged. It also prevents blocking between the primary lamina and the adhesive applied to the plastic film layer, as hereinafter described.

Superimposed on the primary lamina layer is a plastic film lamina, preferably a polyethylene film which may be from about 3 mils to about 10 mils thick, a film of about 5 mils thickness is preferred. This polyethylene film aids in stabilizing the primary layer, and it also serves as a moisture barrier additional to the moisture barrier of the primary lamina.

Superimposed on the plastic film along one or more edges of the membrane is a relatively wide strip of adhesive firmly adherent to the plastic layer.

Preferably, the primary lamina is a blend of asphalt and an elastomer, preferably a paving grade asphalt having a penetration of from about 20 to about 400. A presently preferred asphalt has a softening point of from about 90° F. to about 120° F., a penetration of from about 250 to about 325, and a viscosity at 200° F. of from about 650 to about 750 cps and at 260° F. of from about 100 to about 140 cps. Such a preferred asphalt is identified as OCF Trumbull flux, Specification No. DT-2522, having the following properties:

Softening Point: 100° F.
Penetration: 250–300

Viscosity at 200° F.: 750 cps
Viscosity at 260° F.: 134 cps
Asphaltene Content: 8-14%
Paraffine Content: Less than 35%
Maltene Content: Balance As the rubbery polymer incorporated into the primary lamina and also incorporated into the adhesive, use can be made of a number of elastomer materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D," a series of hydroxy-terminated butadiene polymers; for example, use can be made of hydroxy-terminated butadiene homopolymers like Poly B-D R-15M which has a hydroxy number of 42 or poly B-D R-45M.

Preferably, the rubbery polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-d CN-15 having a hydroxyl number of 39.

The utilization of block copolymers of at least two monoalkenyl arene polymer end blocks and at least one elastomeric conjugated diene polymer midblock are preferred as rubbery polymers in the CMA. The number of blocks in the block copolymer is not of special importance, and the molecular configuration can be linear, graft, radial or star depending upon the method by which the block copolymer is formed. Block copolymers having end blocks of styrene and midblocks of butadiene or isoprene are particularly preferred. Such block copolymers are available under the trade names "Finaprene," available from Cosden Oil & Chemical Co., Dallas, Tex. and "Kraton," available from Shell Chemical Company of Houston, Tex.

The presently preferred rubber polymer or elastomer for blending into the above asphalt to form the layer is Kraton 1011, which is a linear styrene-butadiene-styrene block copolymer containing 30% styrene and 70% butadiene.

The primary lamina was prepared in the following manner:

43 parts by weight of the above-identified asphalt were loaded into a heated mixing tank equipped with a low-speed tank mixer. The asphalt was heated to about 325°-400° F., and 7 parts of the Kraton 1101 was added with the mixer operating. After an initial blending period of 15 minutes, the blend of asphalt and Kraton was heated and slow-mixed for a period of 1 to 2 hours to form a blend. The blend was transferred to a coating tank where 50 parts of $CaCO_3$ as above defined, preheated to 400° F., was then added to the blend and mixed uniformly therein. The resultant binder blend had the composition, by weight:
Asphalt: 43.0%
Kraton 1101: 7.0%
$CaCO_3$: 50.0%

The binder blend had a softening point of 248° F., a penetration of 26, and viscosities of 5125 cps at 350° F., of 3125 cps at 380° F., and of 2125 at 400° F.

In manufacturing the membrane, the above-prepared asphaltic blend at a temperature of about 325° F. is coated onto the upper surface of a release paper by pulling a sheet of the release paper beneath a doctor blade to form a primary lamina which is from about 10 to 180 mils thick, preferably from 30 to 100 mils thick, and most preferably about 55 mils thick.

The polyethylene film is then placed on top of the layer and is pressed firmly onto the hot layer by a pressure roll.

The adhesive strips are then placed onto the film layer by conventional roller coating apparatus. If desired, the strips may be placed by brushing, spraying, or the like. The adhesive strips are at least about ½ inch wide and, preferably, are from about 1½ to about 3 inches wide.

The adhesive is prepared in accordance with the disclosure of the above-recited copending application U.S. Pat. No. 4,654,385, filed Dec. 30, 1985, utilizing the materials and the preparation procedure set forth in said application.

The adhesive is an aqueous emulsion of a normal asphalt and a chemically-modified asphalt (CMA) which is prepared by reacting an asphalt, a vinyl monomer, one or more elastomers, and a acrylamide for an extended period of time, on the order of 20 to 30 hours, at elevated temperatures, on the order of 300° F. to 400° F., under reflux. These various materials are set forth in detail in the above-identified application, but generally the asphalt is preferably a paving grade asphalt, most preferably AC-5 asphalt; the vinyl aromatic monomer preferably is styrene; the rubbery polymer preferably is one or more block copolymers of butadiene or isoprene and styrene as above described in detail, most preferably a mixture of a linear block copolymer and a radial block copolymer are utilized; and the preferred acrylamide is dimethylaminopropylmethylacrylamide (DMAPMA).

Preferably, the ingredients are present in amounts, based on the asphalt content, of from about 0.5 weight percent to about 35 weight percent styrene; from about 0.2 weight percent to about 15% DMAPMA; and from about 0.5 weight percent to about 30 weight percent elastomer. A particularly preferred CMA composition is about 80 weight percent AC-5 asphalt; about 0.5 weight percent DMAPMA; about 9.5 weight percent styrene; about 8% linear styrene-butadiene block copolymer; and 2 weight percent radial styrene-butadiene block copolymer.

The normal or non-CMA asphalt can be any type of asphalt, preferably of a paving grade, and most preferably AC-5 asphalt having a softening point of about 35° C. and a penetration of about 120 at 25° C.

The aqueous emulsion medium preferably is water containing from about 0.5 weight percent to about 3 weight percent of a surfactant, preferably from about 1.0 to about 2.5%. The surfactant can be cationic, anionic or non-ionic, cationic being preferred. The fatty amines, most desirably fatty primary monoamines, are particularly useful. Specifically, Arosurf AA-60 (oleyl amine) can be utilized. Additionally, a thickener, such as 1 part by weight of a 2% aqueous solution of Cyanomer P-250 (polyacrylamide) or hydroxyethyl cellulose at about 0.25% by weight, can be added to the emulsion medium as a viscosity control and as an aid in drying the emulsion in place after it has been deposited on the polyethylene film.

The following example sets forth the formulation of the adhesive.

EXAMPLE

Using a charge of about 80% by weight of AC-5 asphalt, about 0.5% by weight dimethylaminopropylmethacrylamide (DMAPMA), about 9.5% by weight styrene and about 10% elastomer consisting of about 8% Finaprene 1205 and 2% Finaprene 416, a composition was produced as follows. The asphalt at a temperature of about 250° F. to about 310° F. was pumped into a reactor equipped with an agitator and a reflux condenser. The DMAPMA, styrene and elastomer were then added, and the reactor contents were heated at about 348° F. for about 24 hours with agitation and under reflux. The resultant chemically modified asphalt (CMA) had a viscosity of 1800–2000 cps at 285° F.

An aqueous emulsification medium was prepared by adding 2.25 parts by weight Arosurf AA-60 emulsifier (oleyl amine) to 100 parts by weight of water and about 1 part by weight of a 2% aqueous solution of Cyanomer P-250 (polyacrylamide) was also added as a thickener. The emulsification medium was adjusted to a pH of 3 by the addition of hydrochloric acid.

Using a colloid mill, an emulsion was prepared containing 32.5% by weight CMA prepared as above set forth, 32.5% by weight unreacted AC-5 asphalt, and 35% by weight aqueous emulsification medium. The CMA and the asphalt were added at a temperature of about 285° F., and the aqueous medium was at a temperature of about 100° F. The resultant aqueous emulsion had good shelf life and a uniform black color which turned to a brown color upon curing. The emulsion viscosity was 3,544 cps at room temperature, and the emulsion contained 63.46% solids.

In the utilization of the membrane of the present invention, the membrane is applied to the substrate, e.g., to a sub-roof deck or to a basement wall, by simply stripping off the release paper and placing the exposed lower surface of the primary layer directly upon the surface to be covered. The elastomer-containing asphaltic material of the primary layer is self-adherent to the deck. Alternatively, the substrate can be coated with a primer, such as that disclosed in the above-identified application, U.S. Pat. No. 4,654,385, incorporated herein by reference, prior to positioning of the membrane.

Generally, it is necessary to apply two or more strips of material of the membrane to a substrate to completely cover the substrate. To do so, adjacent strips are simply overlapped, and the overlapped portions are tamped by hand pressure to ensure good adhesion between the adhesive strip of the lower membrane and the primary lamina of the upper membrane. The width of the overlap (preferably 1.5 to 3 inches) aids materially in obtaining a good overlap bond.

In a preferred commercial form of the present invention, the membrane has the following physical properties:

| Physical Properties | Value | Test Method |
|---|---|---|
| Tensile Strength | 250 psi | ASTM D412 |
| Elongation | 300% | ASTM D412 |
| Pliability | Pass | ASTM D146 |
| Adhesion | 3.0 psi | * |

*A 3" × 7" membrane sample is applied to a plywood substrate and rolled with a 13 kg roller. After 7 days storage at 70° F., sample is pulled from substrate at 180° angle at rate of 2"/minute.

Thus, the present invention provides a water-impermeable membrane applicable to a substrate and capable of preventing leakage of water to the substrate. The membrane structure of a lower, relatively thick asphalt-elastomer layer preferably self-adhered to the substrate, and the upper polyethylene or like plastic film covering the lower layer results in an effective barrier to water penetration.

The relatively wide, e.g., at least ½" wide and preferably 1½" to 3" wide, adhesive strip along at least one edge, preferably the longitudinal edge, of the membrane ensures an adequate seal between overlapped, adjacent membranes. Also, the complete covering of the membrane primary lamina with the plastic film lamina results in a uniform membrane of good physical properties and of multiple water-impermeable surfaces.

We claim:

1. A laminated water-impermeable membrane, comprising a base lamina of an asphalt-elastomer blend, a moisture barrier lamina of plastic film completely covering the base lamina, and at least one strip of asphalt-based adhesive along at least one edge of the membrane adapted for adhering adjacent membranes in overlapping relation.

2. The membrane of claim 1, wherein the base lamina is superimposed on a release paper.

3. The membrane of claim 1, wherein the base lamina is from about 10 to about 180 mils thick, and the film lamina is from about 3 to about 10 mils thick.

4. The membrane of claim 1, wherein the base lamina is a blend of an asphalt and a block copolymer of styrene and butadiene.

5. The membrane of claim 1, wherein the base lamina is a blend of an asphalt and a block copolymer of styrene and isoprene.

6. The membrane of claim 1, wherein the adhesive is a mixture of chemically modified asphalt and a normal, unmodified asphalt.

7. The membrane of claim 6, wherein the chemically modified asphalt is the reaction product of asphalt, an acrylamide, styrene and a rubbery polymer.

8. The membrane of claim 1, wherein the adhesive strip is from about 1.5 to about 3 inches in width.

9. In a building component including a substrate and a plurality of waterproofing membrane strips adhered to the substrate in overlapping relation, the improvement wherein said membrane strips each comprises a base lamina of an asphalt-elastomer blend, a moisture barrier lamina of plastic film completely covering the base lamina, and a strip of adhesive superimposed on the moisture barrier film lamina, said adhesive strip being interposed between the overlapped portions of adjacent membrane strips to ensure waterproof overlapped joints between the plastic film lamina of the lower strip and the base lamina of the upper strip.

10. A component as defined in claim 9 wherein each overlapped joint is from 1.5 to 3 inches in width.

11. A component as defined in claim 9 wherein the membrane strips are each adhered to the substrate by a primer coating applied to the substrate, the primer comprising an aqueous emulstion of from 40 to about 95% of the reaction product of a major amount of asphalt, a vinyl aromatic monomer, an acrylamide and at least one rubbery polymer and from about 5 to about 50% to additional unreacted asphalt.

12. The building component of claim 9, wherein said substrate is a roof deck.

13. The building component of claim 9, wherein said substrate is a basement wall.

* * * * *